No. 740,673. PATENTED OCT. 6, 1903.
W. C. MANNING, DEC'D.
M. M. C. MANNING, EXECUTRIX.
APPARATUS FOR DISTRIBUTING AMMUNITION.
APPLICATION FILED JAN. 21, 1902.
NO MODEL. 3 SHEETS—SHEET 1.
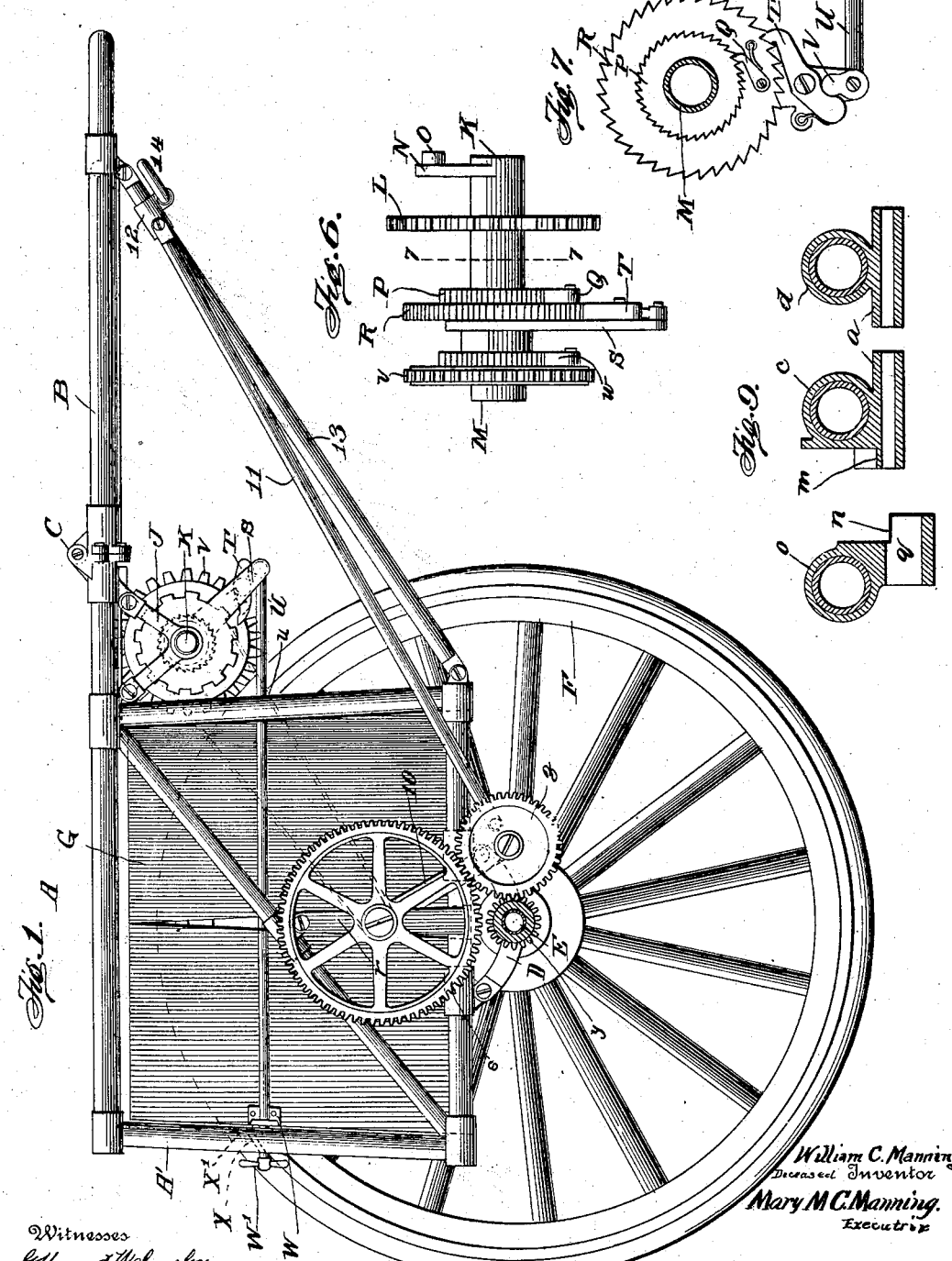

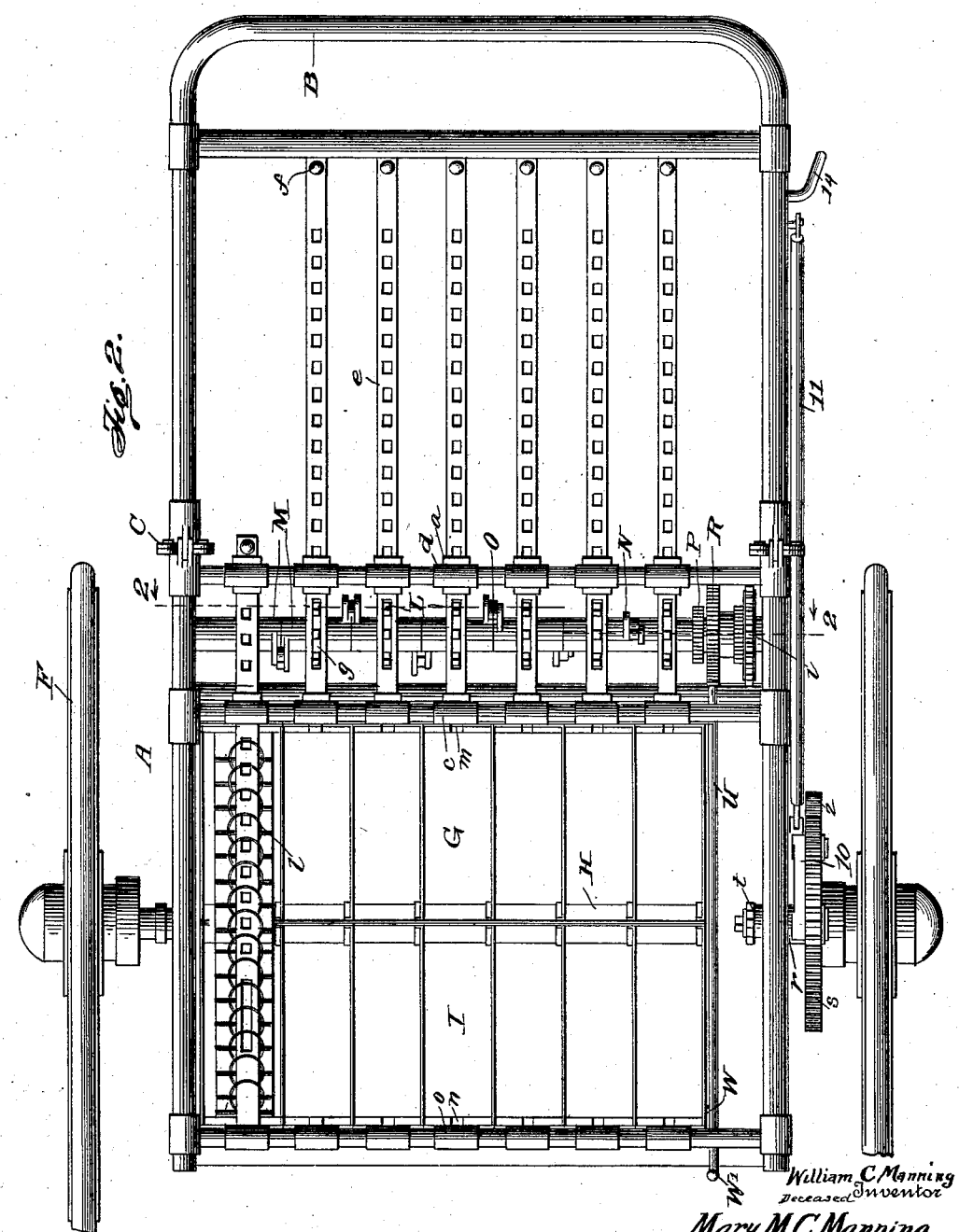

No. 740,673. PATENTED OCT. 6, 1903.
W. C. MANNING, DEC'D.
M. M. C. MANNING, EXECUTRIX.
APPARATUS FOR DISTRIBUTING AMMUNITION.
APPLICATION FILED JAN. 21, 1902.
NO MODEL. 3 SHEETS—SHEET 3.
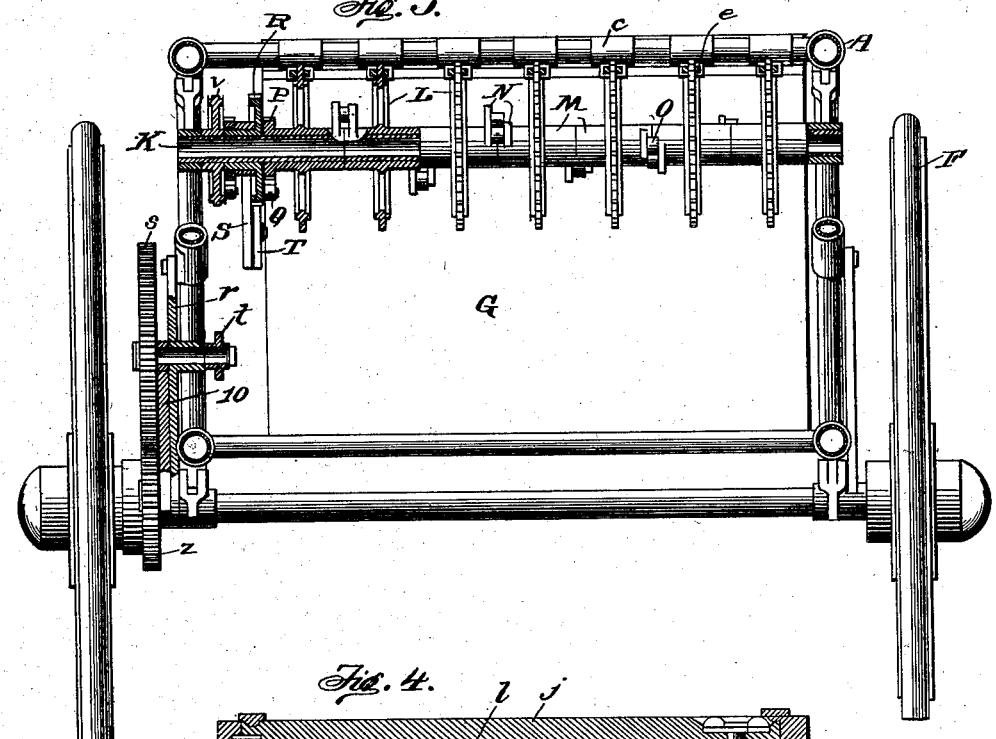
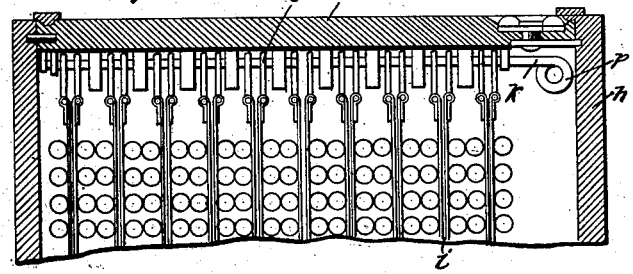
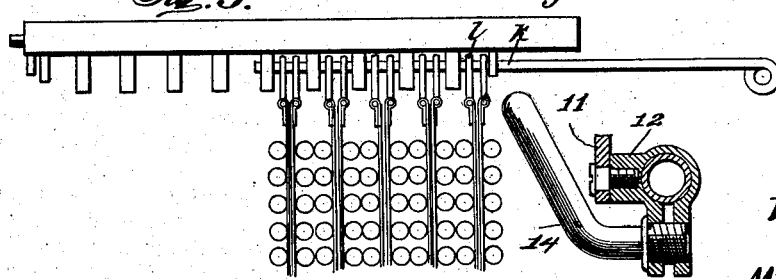
Witnesses
G. Howard Walmsley.
N. A. Mayhew.
William C. Manning
Deceased Inventor.
Mary M C Manning.
Executrix
By James W Bevans
Attorney No. 740,673. Patented October 6, 1903.

UNITED STATES PATENT OFFICE.

MARY M. C. MANNING, OF WASHINGTON, DISTRICT OF COLUMBIA, EXECUTRIX OF WILLIAM C. MANNING, DECEASED.

APPARATUS FOR DISTRIBUTING AMMUNITION.

SPECIFICATION forming part of Letters Patent No. 740,673, dated October 6, 1903.

Application filed January 21, 1902. Serial No. 90,635. (No model.)

*To all whom it may concern:*

Be it known that WILLIAM C. MANNING, deceased, did invent certain new and useful Improvements in Apparatus for Distributing Ammunition, and I, MARY M. C. MANNING, the duly-appointed executrix on the estate of the said WILLIAM C. MANNING, deceased, do hereby declare the following to be a full, clear, and exact description of the invention, such as will enable others skilled in the art to which it appertains to make and use the same.

This invention relates to an apparatus for distributing or supplying ammunition to troops, and more especially when the troops are in action; and the object of the invention is to provide a simple and effective apparatus for rapidly and conveniently supplying ammunition to the troops when the latter are in action in the firing-line.

With the above object in view the invention consists in the novel features hereinafter fully described, particularly pointed out in the claims, and clearly illustrated by the accompanying drawings, in which—

Figure 1 is a side elevation, partly in section, of an ammunition-distributing cart constructed in accordance with the invention; Fig. 2, a plan view of the same; Fig. 3, a transverse section on the line 2 2 of Fig. 2; Fig. 4, a sectional view of a portion of a packing-box for the ammunition; Fig. 5, a view of the lid of said box with the belt-supporting rod partly withdrawn; Fig. 6, an enlarged detail view, in side elevation, of a part of the mechanism for dropping the ammunition; Fig. 7, a sectional view on the line 7 7 of Fig. 6; Fig. 8, a sectional detail view of the lock for holding the automatic part of the mechanism in or out of gear; and Fig. 9, an enlarged sectional detail view of the support for the packing-box lid and the guide for the rack-bars.

Referring now more particularly to the drawings, A represents what will be designated an "ammunition-cart," formed in the present instance of tubing and comprising a suitable framework A', constituting the body of the cart, and having extending forwardly therefrom a frame B, by means of which the cart may be drawn, said frame or handle portion being hinged to the body at C, so that it may be folded to compact form for shipment.

Secured in hangers D, secured to the body, is an axle E, upon which the ground-wheels F are mounted.

Attached to and fitting in the frame constituting the body of the cart is a box or casing G, open at its top and bottom and divided into two compartments by a transversely-extending wall or partition H, which is disposed above the axle and is provided for the purpose of deflecting and preventing the belts carrying the cartridges from falling upon the axle. The two compartments thus formed are divided by a plurality of longitudinally-extending partitions into a number of compartments I, designed to receive the belts, as will be more fully set forth.

Mounted in hangers J, depending from the upper portion of the framework, is a shaft K, which is positioned in front of the ammunition-box and extends transversely of the cart. Loosely mounted upon said shaft is a plurality of gears L, corresponding in number to the number of compartments I, each of said gears being mounted upon a hub M. Each hub is provided with two radially-extending arms N, one at each end, carrying laterally-extending projections O. The arms N at the respective ends of the hub are disposed oppositely to each other, as are the projections carried thereby. The hub at the right of the machine has no arm at its outer end, but instead thereof is provided with a ratchet-wheel P, engaged by a spring-pressed pawl Q, carried by a large ratchet R, also loose on said shaft K.

Loose on the hub of ratchet R is a ratchet-lever S, carrying a spring-pressed pawl T, adapted to engage said ratchet R and having also pivoted thereto an operating-rod U, which is formed at its pivotal end with a cam projection or toe V, designed to engage the pawl and disengage it from the ratchet when the rod is moved inwardly. This rod extends rearwardly through a suitable guiding-plate W, secured to the casing or box G, and is provided with a handle W' and a bail X, adapted to be thrown over a hook X', formed on plate W, for the purpose of holding the rod in its innermost position with the pawl out of engagement with the ratchet. By reciprocating the operating-rod U the ratchet R is rotated, and by engagement of the pawl Q with the ratchet P the gear on the first hub at the right of the machine is also rotated. When this first gear has made a complete revolution, the next gear of the series is revolved, this being effected by the contact of the lateral projections O of arms N, which serve to lock each gear of the series to the gear on the right when the latter has completed a revolution, and this is continued throughout the entire series. Movable longitudinally of the cart through guides $a$, formed on sleeves $c$ and $d$, secured to transversely-extending bars or tubes of the frame of the cart, are rack-bars $e$, meshing with gears L and designed to be moved thereby across the top of the ammunition-box, there being one rack-bar for each of the belt-receiving compartments I of said box. These rack-bars are provided at their forward ends with handles $f$, by which they may be moved inwardly by hand to receive the belts, as will be more fully set forth, and formed at their rear ends with elongated slots $g$, so that the gears may continue to revolve without engaging them when they have been withdrawn from the belts.

A box $h$ is provided for the transportation and storage of the belts $i$, carrying the ammunition, the belts being attached to the under side of the lid $j$ of the box by a rod $k$, which passes through suitable guides and through rings $l$, carried by the ends of the belts, each belt being folded once, as illustrated in Figs. 4 and 5. The cover $j$ of the box in loading the cart is withdrawn from the box with the belts and positioned above one of the compartments I of the ammunition-box of the cart, with the belts depending into said compartment, as illustrated in Fig. 2, the lid or cover resting at its end upon seats $m$ and $n$, formed, respectively, upon collar $c$, before referred to, and collar $o$, attached to the rear upper transverse tube of the frame, with the eye end $p$ of rod $k$ in an opening $q$, formed in said collar, which opening is enlarged to permit the insertion of a suitable device for engaging and withdrawing the rod. When the cover or lid is thus positioned, the belts are threaded upon the rack-bar $e$ by moving the latter rearwardly by hand, it passing through the rings of the belt beneath the rod $h$. Said rod $h$ is then withdrawn, causing the belts to be suspended from the rack-bar, after which the cover is removed. It will be understood that the belts may be positioned directly upon the rack-bar without the use of the packing-box cover, although it is preferable to suspend them from the rack-bar in the manner described, as they can be much more quickly and conveniently threaded upon said bar in this manner. All of the compartments I are filled with belts and the latter suspended from the rack-bars by moving said bars rearwardly one at a time, beginning at the left-hand side of the machine.

This method of discharging the belts from the cart consists in causing the rack-bars supporting them, as above described, to travel *seriatim* toward the front of the cart, thus allowing the belts to drop as the rack-bars pass from engagement with the rings thereof, and this forward movement of the bars may be effected either by hand through the medium of the construction already described or automatically by means of the construction which will be hereinafter fully set forth. To effect the discharge of the belts from the cart by hand, the operating-rod U is reciprocated, transmitting motion to gear R, which in turn effects the rotation of the first gear on the right, effecting the forward movement of the first of the series of rack-bars and discharging the belts therefrom. When said rack-bar has been withdrawn, motion is transmitted to the next gear through the medium of the radial arm N and lateral projections O carried thereby and the second rack-bar withdrawn, the motion being transmitted from one gear to the other until all of the rack-bars have been withdrawn and the belts suspended therefrom discharged. The rod U may be operated as rapidly as desired, so as to drop the belts in lots of five or ten or any desired number. When the first rack-bar has been withdrawn, there is no further movement of the same, although the gear continues to rotate, owing to the elongated slot $g$, formed at the rear end of each bar.

To effect the automatic discharge of the belts, the following mechanism is provided: Mounted on a suitable hanger $r$, attached to the frame of the cart, is a large gear $s$, having attached to the shaft thereof a small chain-wheel $t$, around which a chain $u$ passes, said chain also passing around a chain-wheel $v$, loose on shaft K and carrying the pawl $w$, engaging a ratchet $x$ upon the hub of large ratchet R. Fixed on the hub of one of the ground-wheels is a pinion $y$, and adapted to be moved into and out of gear with pinion $y$, and thus complete the train of gearing, is a gear $z$, which is mounted upon an arm 10, pivoted upon the shaft of gear $s$, and which meshes with said gear $s$. For swinging this gear $z$ into and out of operative position is a rod 11, pivoted at its rear end to arm 10 and at its opposite end to a split sleeve 12, slidable upon one of the braces 13, connecting the body and handle portion of the cart. This sleeve is clamped to and released from said brace and moved thereon by a hand-screw 14, threaded through the split portions thereof. By moving gear $z$ into mesh with pinion $y$ motion is transmitted from the ground-wheel to gear $s$ and from said gear to the chain-wheels by the chain $u$. Motion is transmitted from wheel $z$ to ratchet $x$ through the medium of pawl $w$, and consequently to ratchet P through the medium of pawl Q, carried by ratchet R, upon the hub of which said ratchet x is formed or attached. The motion would then be transmitted from one to the other of the gears L and the rack-bars moved toward the front of the cart *seriatim*. The belts would thus be discharged automatically, and the several parts of the mechanism are so constructed and arranged that the belts will be discharged a distance apart equal to the distance between the men when in the firing-line. The cart would ordinarily have three attendants, two in the front to pull and one in the rear to assist by pushing and, if desired, to operate the hand discharging mechanism, or the cart may be so constructed as to be drawn by horses.

Obviously many mechanical changes may be made in this invention without departing from the spirit and scope of the same; but

What is claimed, and sought to be covered by Letters Patent of the United States, is—

1. In an ammunition-supply cart, the combination with the cart-body, of a plurality of supporting-bars carried thereby, said bars being adapted to support a plurality of belts loaded with ammunition, and mechanism for successively withdrawing the said bars from engagement with said belts whereby the belts are allowed to drop from said cart, substantially as described.

2. In an ammunition-supply cart, the combination with the cart-body, of a plurality of supporting-bars adapted to have ammunition-belts suspended therefrom, toothed wheels adapted to gear with said bars, means for imparting motion to one of said wheels and a device intermediate between adjacent wheels whereby motion is transmitted from one to the other of said wheels after the first wheel of such pairs of adjacent wheels has revolved through a predetermined angle, thereby withdrawing the said bars from said belts successively and allowing the said belts to drop from said cart in definite order, substantially as described.

3. In an ammunition-supply cart, the combination with the cart-body, of a plurality of supporting-bars, running longitudinally of said cart, said bars adapted to have a plurality of belts loaded with ammunition suspended therefrom, toothed wheels adapted to gear with said bars, means for automatically imparting rotary motion to one of said wheels, devices intermediate between adjacent wheels whereby the motion of one of said wheels is transmitted to the other after the first wheel of such pairs of adjacent wheels has revolved through a predetermined angle, whereby the said bars are successively withdrawn from engagement with said belts allowing them to drop from said cart in predetermined order, substantially as described.

4. In an ammunition-cart, the device for discharging the ammunition therefrom, which consists of a plurality of rack-bars extending longitudinally of said cart, a shaft extending transversely of said cart, a plurality of toothed wheels mounted loosely on said shaft and gearing with the said rack-bars, lug devices mounted loosely on said shaft intermediate between adjacent toothed wheels and rigidly secured to the said wheels, the said lug devices transmitting motion from one of said wheels to the next of the series, a ratchet mounted loosely on said shaft and rigidly secured to one of said toothed wheels, a toothed wheel loosely mounted on said shaft contiguous to said ratchet, a pawl carried by said contiguous toothed wheel and engaging said ratchet, a depending arm contiguous to the wheel and loosely mounted on said shaft, a pawl carried by said depending arm and engaging the teeth of said contiguous toothed wheel, and a rod secured to the lower end of said depending arm whereby oscillatory motion may be imparted thereto, substantially as described.

5. In an ammunition-supply cart, the combination with a plurality of supporting-bars, adapted to have ammunition-belts suspended therefrom, toothed wheels adapted to withdraw the said bars from engagement with said belts, means for transmitting motion from one of said toothed wheels to the next in the series, and means for transmitting motion from the ground-wheel of the cart to the said toothed wheels whereby they may be made to withdraw the said bars from said belts and allow the belts to drop from the cart in definite order, and means for putting said ground-wheel in or out of gear with the discharging mechanism, substantially as described.

6. In an ammunition-cart, the combination with the axle thereof, of a pinion mounted on said axle, a lever fulcrumed above said pinion, a gear-wheel carried by said lever and adapted to engage or disengage the said pinion as the lever is operated, a second gear-wheel meshing with the first and mounted on an axis coincident with the fulcrum of the lever, a sprocket-wheel rigidly secured to said second gear and mounted on the same axis therewith, a second sprocket-wheel geared by a chain with the first sprocket, a plurality of toothed wheels adapted to receive rotary motion from said sprocket and gearing, a plurality of supporting-bars adapted to have travel imparted to them by said toothed wheels, said bars adapted to support a plurality of belts loaded with ammunition, said belts being dropped from said cart by the withdrawal of the said bars, substantially as described.

7. In an ammunition-supply cart, the combination with the running-gear and framework thereof, of a bottomless box-like portion, a plurality of bars extending longitudinally of said cart and adapted to be moved across said box-like portion, said bars being adapted to support ammunition-belts, and means for successively withdrawing said bars from engagement with said belts whereby the belts are dropped from said cart, substantially as described.

8. In an ammunition-supply cart, the combination with the cart-body, of a plurality of box-covers supported thereby, guide-supports carried by said covers, rods passing through said guides in the direction of the length of said covers and acting as temporary supports for ammunition-belts, a plurality of supporting-bars passing through said guide-supports, said bars adapted to support said belts, and means for automatically removing said bars from engagement with said belts whereby the said belts are allowed to drop from said cart, substantially as described.

9. In an ammunition-supply cart, the combination with the cart-body, of a plurality of box-covers carried thereby, means carried by said covers for supporting ammunition-belts, a plurality of supporting-bars adapted to receive the belts from said covers, and means for automatically withdrawing said bars from engagement with said belts, thereby allowing said belts to drop from said cart, substantially as described.

10. In an ammunition-supply cart, the combination with the cart-body, of a plurality of covers carried thereby, removable supports carried by said covers and adapted to support ammunition-belts, a plurality of supporting-bars adapted to receive the belts from said supports, a plurality of toothed wheels adapted to gear with said bars, mechanism for operating said wheels, whereby the said bars may be withdrawn from engagement with said belts, substantially as described.

11. The combination with an ammunition-supply cart, of ammunition packing-boxes, removable covers carried by said boxes, said covers adapted to be carried by said cart and provided with a plurality of guides on their under sides, rods passing through said guides, and adapted to support ammunition-belts, a plurality of supporting-bars passing beneath said covers and adapted to receive the belts therefrom, and means for automatically withdrawing said bars from engagement with said belts whereby the latter are allowed to drop from said cart, substantially as described.

12. The combination with an ammunition-supply cart, of ammunition packing-boxes, removable covers carried by said boxes, said covers adapted to be carried by said cart, and provided with a plurality of guides on their under sides, rods passing through said guides and adapted to have ammunition-belts suspended therefrom, a plurality of supporting-bars passing through said guides and adapted to receive said belts, and means for withdrawing said bars from engagement with said belts whereby the latter are allowed to drop from said cart, substantially as described.

13. In an ammunition-cart, the combination with the axle thereof, of a pinion mounted thereon, a lever fulcrumed above said pinion, a gear-wheel carried by said lever and adapted to engage or disengage the pinion, an operating-rod for effecting the movement of said lever, means for locking said rod with the gear in or out of mesh with the pinion, a second gear-wheel meshing with the first and mounted on an axis coincident with the fulcrum of the lever, a toothed wheel, an operative connection between said last-mentioned gear and the toothed wheel, a supporting-bar adapted to have travel imparted thereto by said toothed wheel, said bar adapted to support a plurality of belts loaded with ammunition, said belts being dropped from said cart by the withdrawal of said bar, substantially as described.

14. In an ammunition-cart, the combination with the axle thereof, of a pinion mounted on said axle, a lever fulcrumed above said pinion, a gear-wheel carried by said lever and adapted to engage or disengage said pinion as the lever is operated, an operating-rod pivoted to said lever, a split sleeve adapted to slide upon the framework of the cart and to which the opposite end of the lever is pivoted, a hand-screw threaded into the split portion of said sleeve and adapted to clamp the sleeve to and release it from the frame, a second gear-wheel meshing with the first, and mounted on an axle coincident with the fulcrum of the lever, a toothed wheel, an operative connection between said toothed wheel and the last-mentioned gear-wheel, a supporting-bar adapted to have travel imparted thereto by said toothed wheel, said bar adapted to support a plurality of belts loaded with ammunition, said belts being dropped from said cart by the withdrawal of said bar, substantially as described.

15. In an ammunition-cart, a rack-bar adapted to support ammunition-belts, a toothed wheel gearing with the said rack-bar and adapted to withdraw the same from the belts, a ratchet carried by said toothed wheel, a second ratchet mounted independently thereof and carrying a pawl engaging said first-mentioned ratchet, a ratchet-lever carrying a pawl adapted to engage the second ratchet, an operating-rod pivoted to said lever, and means carried by said rod adapted to disengage the pawl of the ratchet-lever from the ratchet when the rod is moved to inoperative position, substantially as described.

16. In an ammunition-cart, a rack-bar adapted to support ammunition-belts, a toothed wheel gearing with the said rack-bar and adapted to withdraw the same from the belts, a ratchet carried by said toothed wheel, a second ratchet mounted independently thereof and carrying a pawl engaging said first-mentioned ratchet, a ratchet-lever carrying a pawl adapted to engage the second ratchet, an operating-rod pivoted to said lever, and a cam-toe carried by said rod adapted to engage the pawl carried by the lever and hold the same out of engagement with its ratchet when the rod is moved to inoperative position, substantially as described.

In testimony whereof I hereunto affix my signature in the presence of two witnesses.

MARY M. C. MANNING,
*Executrix of the estate of William C. Manning, deceased.*

Witnesses:
 JAMES W. BEVANS,
 E. P. PENDLETON.